United States Patent
Vogel et al.

(10) Patent No.: US 12,284,954 B2
(45) Date of Patent: Apr. 29, 2025

(54) DEVICE FOR PROMOTING THE GROWTH OF PLANTS

(71) Applicant: Fraunhofer-Gesellschaft zur Foerderung der angewandten Forschung e.V., Munich (DE)

(72) Inventors: Simon Vogel, Aachen (DE); Stefan Schillberg, Aachen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/000,178

(22) Filed: Aug. 21, 2020

(65) Prior Publication Data

US 2020/0383286 A1    Dec. 10, 2020

Related U.S. Application Data

(63) Continuation-in-part of application No. 16/618,084, filed as application No. PCT/EP2018/064182 on May 30, 2018, now Pat. No. 12,201,071.

(30) Foreign Application Priority Data

May 30, 2017    (EP) .................................... 17173370

(51) Int. Cl.
    *A01G 31/04*    (2006.01)
(52) U.S. Cl.
    CPC ................................. *A01G 31/042* (2013.01)
(58) Field of Classification Search
    CPC ........ A01G 31/042; A01G 7/045; A01G 7/04; A01G 9/249
    See application file for complete search history.

(56) References Cited

U.S. PATENT DOCUMENTS

| 2,244,677 A | 6/1941 | Cornell |
| 3,254,447 A * | 6/1966 | Ruthner ................... A01G 9/14 47/65 |

(Continued)

FOREIGN PATENT DOCUMENTS

| AT | 250728 B | 10/2003 |
| CN | 102640679 A | 8/2012 |

(Continued)

OTHER PUBLICATIONS

Frain Industries, Inc., Stainless Steel Frame Adjustable Length Top Conveyor, Oct. 14, 2014, https://www.youtube.com/watch?v=snpMtuLa-II (Year: 2014).*

(Continued)

*Primary Examiner* — Magdalena Topolski
(74) *Attorney, Agent, or Firm* — Biotech Beach Law PC; Raymond Wagenknecht

(57) ABSTRACT

Devices and methods for promoting the growth of plants, which transport the plants using a conveyor belt where roots of the plants protrude into a region located below a lower surface of the conveyor belt and at least parts of leaves and/or fruits of the plants protrude into a region located above an upper surface of the conveyor belt which opposes the lower surface. The conveyor path moves along a closed circular or oval path such that a deflection occurs in the region of an upper deflection point and in the region of a lower deflection point, which interconnect vertical sections.

16 Claims, 3 Drawing Sheets

(56) References Cited

U.S. PATENT DOCUMENTS

| | | | |
|---|---|---|---|
| 3,254,448 A | 6/1966 | Ruthner | |
| 3,276,163 A | 10/1966 | Oepen et al. | |
| 3,327,425 A | 6/1967 | Miroslav et al. | |
| 3,432,965 A | 3/1969 | Smith et al. | |
| 3,664,061 A | 5/1972 | Oepen | |
| 3,809,207 A * | 5/1974 | Euverard | B65G 17/063 198/779 |
| 3,824,736 A * | 7/1974 | Davis | A01G 7/045 47/17 |
| 3,909,978 A | 10/1975 | Fleming | |
| 4,221,764 A | 9/1980 | Saxon | |
| 4,255,897 A * | 3/1981 | Ruthner | A01G 9/24 47/DIG. 6 |
| 4,317,308 A * | 3/1982 | Derrick | A01G 18/69 47/65 |
| 4,327,538 A | 5/1982 | Milhem et al. | |
| 4,337,986 A | 7/1982 | Haub et al. | |
| 4,356,664 A | 11/1982 | Ruthner | |
| 4,360,989 A | 11/1982 | Kubin et al. | |
| 4,965,962 A * | 10/1990 | Akagi | A01G 31/045 47/62 A |
| 5,685,411 A * | 11/1997 | Zimmerman | B65G 45/22 198/464.4 |
| 5,943,818 A | 8/1999 | Fruehwirth | |
| 7,168,206 B2 * | 1/2007 | Agius | A01G 31/042 47/62 R |
| 8,627,598 B1 * | 1/2014 | Souder | A01G 31/06 47/60 |
| 10,112,814 B1 * | 10/2018 | Shelor | A01G 22/00 |
| 10,412,908 B2 | 9/2019 | Agari et al. | |
| 10,736,283 B2 * | 8/2020 | Ng | A01G 22/00 |
| 10,736,284 B2 | 8/2020 | Baker | |
| 11,109,545 B2 | 9/2021 | Xu et al. | |
| 11,129,344 B2 * | 9/2021 | Mawendra | A01G 9/243 |
| 11,291,161 B2 * | 4/2022 | Mann | A01D 43/00 |
| 2006/0201058 A1 * | 9/2006 | Ripatti | A01G 31/042 47/1.1 |
| 2009/0165373 A1 | 7/2009 | Souvlos et al. | |
| 2012/0279122 A1 | 11/2012 | Benne et al. | |
| 2013/0305601 A1 | 11/2013 | Park | |
| 2014/0165462 A1 | 6/2014 | Shigyo et al. | |
| 2014/0325908 A1 | 11/2014 | Faris | |
| 2015/0000194 A1 | 1/2015 | Meerman | |
| 2015/0250115 A1 * | 9/2015 | Pickell | A01G 31/042 47/62 R |
| 2016/0192594 A1 | 7/2016 | Mawendra | |
| 2016/0302369 A1 | 10/2016 | Pickell et al. | |
| 2017/0118922 A1 * | 5/2017 | Sherertz | A01G 31/042 |
| 2017/0202163 A1 * | 7/2017 | Aschheim | A01G 31/02 |
| 2020/0329654 A1 * | 10/2020 | Westlind | A01G 9/025 |
| 2020/0367455 A1 * | 11/2020 | Vesty | A01G 9/247 |
| 2023/0157220 A1 * | 5/2023 | Daoust | A01G 31/042 47/65 |
| 2023/0404001 A1 * | 12/2023 | Mallinowski | A01G 31/042 |

FOREIGN PATENT DOCUMENTS

| | | | |
|---|---|---|---|
| CN | 112167042 A * | 1/2021 | |
| DE | 1286800 B | 1/1969 | |
| DE | 1782764 A1 | 8/1972 | |
| DE | 2852936 A1 | 6/1979 | |
| EP | 0220348 A1 | 5/1987 | |
| EP | 1210868 A1 | 5/2002 | |
| EP | 2489256 A2 | 8/2012 | |
| EP | 2491784 A1 | 8/2012 | |
| FR | 3021841 A1 | 6/2014 | |
| FR | 8021841 A1 | 12/2015 | |
| JP | 66242695 A | 2/1987 | |
| JP | 62170930 A | 7/1987 | |
| JP | S6242695 Y2 * | 11/1987 | |
| JP | 86420037 A | 1/1989 | |
| JP | 64-43143 A | 2/1989 | |
| JP | S6443143 A | 2/1989 | |
| JP | 03133324 A | 6/1991 | |
| JP | 103133324 A | 6/1991 | |
| JP | 08047348 A | 2/1996 | |
| JP | H0847348 A | 2/1996 | |
| JP | 2014-168420 A | 8/2015 | |
| KR | 20120073480 A | 7/2012 | |
| KR | 10-2012-0094769 | 8/2012 | |
| KR | 20200116639 A * | 10/2020 | |
| WO | 2010/008335 A1 | 1/2010 | |
| WO | 2015/122849 A1 | 8/2015 | |
| WO | 2016/023947 A1 | 2/2016 | |
| WO | WO-2022263293 A1 * | 12/2022 | |

OTHER PUBLICATIONS

11201910080W Singapore Written Opinion mailed Jan. 11, 2021.
20188084.6 Extended European Search Report mailed Oct. 30, 2020.
CN2020106622954 Search Report mailed Nov. 10, 2021.
CN2020106622954 Office Action mailed Nov. 30, 2021.
SA519410424 Office Action mailed Dec. 14, 2021.
SA519410424 Search Results mailed Dec. 14, 2021.
JP2019566196 Office Action mailed Jan. 5, 2022.
CN2018800501139 Search Report mailed Apr. 27, 2021.
KR2018800501139 Office Action mailed Nov. 10, 2021.
PCT/EP2018/064182 International Search Report mailed Aug. 20, 2018.
EP17173370.2 Office Action mailed May 8, 2020.
AU 2020210163 Examation Report No. 1 mailed Jan. 6, 2022.
JP2019-566196 Decision fro Refusal mailed Apr. 26, 2022.
JP2020-128114 Decision for Refusal mailed Jun. 14, 2022.
KR 10-2019-7032233 Notice of Submission of Opinion mailed Jan. 30, 2023.
KR 10-2020-7021726 Notice of Submission of Opinion mailed Jan. 30, 2023.
SG 11201910080W Written Opinion dated Jan. 11, 2021.
Office Action summary of Ae P6001553/2019, mailed Jul. 31, 2023.
Search Report for Ae P6001553/2019, mailed Jul. 31, 2023.
Examination Report for Ae P6001553/2019, mailed Jul. 31, 2023.

* cited by examiner

DEVICE FOR PROMOTING THE GROWTH OF PLANTS

CROSS REFERENCE TO RELATED APPLICATIONS

This is a continuation in part of U.S. patent application Ser. No. 16/618,084, filed Nov. 27, 2019, which is a a US national phase application under 35 USC § 371 of international patent application no. PCT/EP2018/064182, filed May 30, 2018, which itself claims priority to European application 17173370.2, filed May 30, 2017. Each application referred to in this paragraph is herein incorporated by reference in its entirety.

TECHNICAL FIELD OF THE INVENTION

The invention relates to a device for automated plant cultivation and more specifically to a device having a conveyor belt that can be moved along a conveyor path for transporting plants. While the plants are being transported along the conveyor path, which extends at least approximately horizontally in at least one first section and at least approximately vertically in at least one second section, the plants are at least temporarily supplied with water and nutrients by a nutrient supply unit.

BACKGROUND OF THE INVENTION

Hydroponic and aeroponic plant cultivation has been known for many years; in particular in the last decades, these plant-cultivating methods have been used for intensively exploiting cultivation systems, particularly for greenhouse crops, e.g. tomatoes, cucumbers and lettuces. The mass production of agricultural products in fully air-conditioned buildings in which external influences are strictly controlled is also referred to as "indoor farming."

In this connection, there are known systems for cultivating plants in which the plants are arranged in a shelf system and supplied with a nutrient medium in an automated manner during the growth phase. One system of this kind is described in JP 2014-168420 A, for example. In this case, the plants intended to be cultivated are individually fixed in a carrier medium in a horizontal plane and are supplied with water and nutrients by means of regular nutrient medium flooding and drainage. In addition, the plants are artificially illuminated by fluorescent tubes or LEDs attached directly above the plants.

Furthermore, AT 250728 discloses a special greenhouse in the form of a tower greenhouse. What is essential in this case is that the height of a building is exploited to implement a conveyor path for cultivating plants. The described greenhouse has a plurality of plant-transporting conveyor belts arranged in a serpentine manner; the conveyor belt is in the form of a circulating path and has upper and lower deflection pulleys such that the plants can be moved vertically in different directions. To ensure efficient illumination, suitable fluorescent tubes are provided between the vertically arranged conveyor belts.

A further technical solution for automated plant cultivation is described in US 2012/0279122 A1. The described system has a conveyor belt that is arranged in a serpentine manner and extends vertically in part. To deflect the conveyor belt, corresponding deflection pulleys are provided. Furthermore, special containers are provided to transport the plants; carrier material for holding seeds or plants is located in said containers, which are hooked into the circulating conveyor belt by means of special hook elements. In this case, the described containers for holding the plants extend over the entire range of the conveyor belt and can each hold a plurality of plants one next to the other.

Despite the increased energy demand, the known automated systems for cultivating plants have a number of advantages over conventional agriculture in fields. In addition to complete weather independence, the climatic conditions inside the greenhouse can be optimally adapted to any given plants, thereby achieving constant plant growth. Furthermore, owing to special water recovery systems, a significantly smaller amount of water is required to cultivate the plants than if the farming fields are outdoors. Moreover, a comparably small amount of fertilizer is required, and cultivating plants in fully air-conditioned spaces makes it possible to grow the plants without pesticides.

Furthermore, the use of vertically arranged conveyor paths achieves the advantage of significantly improved exploitation of the available surface area. This is highly advantageous particularly in urban areas and developed countries that have a comparably small amount of surface area suitable for agriculture, such as Japan.

The problem with the known systems for automated plant cultivation in fully air-conditioned rooms is often that it is relatively complex to adapt the used systems to different plants. When the plants grown are changed, account has to be taken of the fact that the size of different plants changes to different extents and in different periods of time in the growth phase. It is difficult to adapt the known systems for automated plant cultivation to any given altered conditions. What is more, supplying the plants with the required nutrients and water without causing damage to the leaves or roots often presents problems.

SUMMARY OF THE INVENTION

Proceeding from the known prior-art systems for automated plant cultivation and the above-mentioned problems, the problem addressed by the invention is that of providing a plant cultivation system that allows crops and ornamental plants to be cultivated, preferably in closed spaces, in a manner that is simple and adapted to the plant growth phase. The specified technical solution is intended to allow the cultivation of plants to be practically entirely automated, in particular in a comparably simple manner, from placing a seed to harvesting the fully matured plant. Furthermore, it is intended to be ensured that the water and nutrient requirements can be kept to a minimum. The device according to the invention is characterized by a simple structural design that preferably can be achieved using the known system components for constructing automated greenhouse systems.

The aforementioned problem is solved by a device for promoting the growth of plants, in particular for automated plant cultivation, the device having a conveyor belt that can be moved along a conveyor path and is intended for transporting plants at least in sections. The transported plants, while being moved along the conveyor path, are at least temporarily illuminated and supplied with nutrients and water by a nutrient supply and, while being conveyed along the conveyor path, are moved at least approximately horizontally in at least one first section and at least approximately vertically in at least one second section.

The plants are at least temporarily fixed relative to the conveyor belt during transport along the conveyor path such that at least parts of roots of the plants protrude into a region located below a lower surface of the conveyor belt, while at least parts of leaves and/or fruits of the plants protrude into a region located above an upper surface of the conveyor belt which opposes the lower surface, a nutrient-medium supply being arranged below the conveyor belt such that the plants fixed on the conveyor belt, in particular the roots below the conveyor belt, are aeroponically supplied with nutrient medium. In this context, essential features of the invention are that the plants, during their growth phase, are fixed on the conveyor belt, continuously moved and at least temporarily transported along a light source, and that a nutrient-medium supply, in particular having spray nozzles, is located spaced apart from the lower surface of the conveyor belt, the nutrient-medium supply ensuring that the plants are aeroponically supplied with nutrient medium in said region. Furthermore, during the movement, which is preferably both vertical and at least temporarily horizontal, the root region is continuously supplied with nutrients. On account of the special arrangement of the conveyor path having at least approximately vertically upwardly and downwardly extending path sections, the plants are continuously realigned, which encourages plant growth.

In a specific embodiment of the invention, the conveyor belt includes, at least in regions, a carrier material in which the plants are at least temporarily fixed during transport along the conveyor path. Preferably, the carrier material is selected such that the seeds or plants are held firmly in place and the material can also distribute and at least temporarily store water and/or nutrient medium. Since the device according to the invention transports the plants at least temporarily approximately vertically, it is possible, according to a particular development of the invention, for the plants to be continuously moved, during the growth phase thereof, along an illumination source and/or towards said illumination source, the plants preferably being illuminated as soon as they are moved vertically. Advantageously, the root region located on the lower surface of the conveyor belt is simultaneously aeroponically supplied with nutrients and moisture. The aeroponic supply of nutrients to the root region also preferably takes place at least temporarily while the plants are being moved vertically. In this connection, it is conceivable for an upper deflection point to be provided between two vertically extending sections of the conveyor path such that the plants, together with the conveyor belt, are moved vertically upwards and then vertically downwards after passing the deflection point, the orientation of the plants, from the root to the tip of the shoot, being perpendicular to said movement direction.

It is generally conceivable to use natural light and/or artificial light for illumination, said artificial light being generated by means of an illumination unit having, for example, at least one fluorescent tube and/or LED. The provision of an illumination unit for generating light is advantageous in that the plants can be illuminated in a selective manner, in particular in a manner adapted to the type of plant to be grown and/or aligned with the plant growth, and at all times if required. According to a particular development of the invention, the plants are only illuminated in particular regions of the conveyor path, in particular in selected regions in which the plants are moved vertically and particularly preferably over half of the total vertical regions such that a day/night rhythm can be imitated. Advantageously, the plants are illuminated by vertically arranged LED panels or other illumination systems.

According to a specific development, the illumination unit is designed such that the plants are illuminated in specially selected sections of the conveyor path. Advantageously, the plants are illuminated while they are being moved continuously upwards along a vertical section of the conveyor path. Moreover, it is advantageous for the plants to be at least temporarily no longer illuminated after passing the deflection point, in particular as soon as said plants are being moved vertically downwards.

In a particularly advantageous embodiment, the plants fixed on the conveyor belt, in particular the roots below the conveyor belt, are aeroponically supplied with nutrient medium as soon as said plants are being moved vertically, while the plants are moved at least in part through an immersion bath in the region of a lower deflection point, which is located between two vertically extending sections of the conveyor path, such that the plants, in particular the roots, are hydroponically supplied with nutrients in said region. Over the serpentine or meandering conveyor path having vertically extending path sections, between which lower and upper deflection points or regions are located, the plants are thus continuously supplied with nutrients and moisture. A nutrient-medium misting system is preferably used to aeroponically water the roots of the plants. By means of an automated plant cultivation system designed as described above, it is preferably possible for the roots to be continuously aeroponically watered on the lower surface of the conveyor belt, while the plant carrier material is hydroponically bathed in the region of the lower deflection points when the conveyor belt is in the trough phase.

By fixing the plants on the conveyor belt, the roots are aeroponically watered continuously or at least for long periods of time, without unnecessarily moistening the leaves of the plant. In this way, diseases of the leaf mass are reliably prevented. The temperature and humidity of the atmosphere below the conveyor belt, in particular along the vertical conveyor path sections, are monitored by a sensor system, and the values are suitably controlled by a central control unit such that excessive humidity can be reliably avoided in said region.

Advantageously, the conveyor path is dimensioned and/or the speed of travel of the conveyor belt is/are adjusted such that a single up and down movement of the conveyor belt with one deflection in between, along with simultaneous lower-surface moistening of the root region, is configured as one module, a cultivation cycle of this kind preferably being completed in 24 hours. A modular design advantageously makes it possible to adapt an overall system for automated plant cultivation to any given requirements, i.e. to any given plant species and/or growing phase. By lengthening the conveyor belt by lining up modules, a complete growing period for a crop can be easily obtained, each module being adapted to the needs of the growth stage of the given plants with regard to nutritional requirements, illumination and surface area requirements. For this reason, according to a preferred embodiment of the invention, the individual modules or sections of the conveyor path, together with the conveyor belt, are designed such that it is possible to change in particular the length of the lower sections located between two vertically extending path sections. If a plurality of modules is assembled to form an overall system, it makes sense for the distances between an approximately vertically downwardly extending path section and an approximately vertically upwardly extending path section to widen as the transport duration of the plants increases, such that the distances are adapted to the plant growth. By deliberately varying the distance between the vertically extending paths, it is thus possible to adapt the distance to the given size of the plants fixed on the conveyor belt.

Furthermore, alternatively or as a complement to the above-described embodiment, it is advantageously conceivable to achieve the adjustment of a device for automated plant cultivation to the size requirements of the given plants by changing the distance between the points at which the individual plants are fixed on the conveyor belt. Preferably, mechanical elements are provided for this purpose, which ensure that the distance between the individual fixing points can be adjusted as required. For instance, it is conceivable for the individual fixing points to be spread further apart as the transport duration of a plant increases and the plant grows, with locking positions in different positions being conceivable. According to a further preferred embodiment of the invention, the conveyor belt has stiff lined-up slats, which may be made of various materials, such as polyvinyl chloride (PVC). Slats of this kind allow the plants to be easily anchored and are at the same time distinguished by a high degree of flexibility such that the conveyor belt can be guided over the deflection pulleys.

By adjusting the conveyor path or the conveyor belt to the changing size of the plants in this way, the increasing space requirement of the plant is met, and the use of material and energy is minimized. In this way, the system is operated particularly efficiently from both economical and ecological perspectives since expenditure is significantly reduced in the seedling phase for watering and illumination, for example.

According to the invention, the conveyor path or the conveyor belt moved along the conveyor path is moved along a closed circular or oval path. Two vertical sections and two horizontal sections in the region of the deflection points are thus provided, the horizontal sections interconnecting the vertical sections. By changing the length of the vertical sections of the conveyor belt, it is possible to construct a plant cultivation system of this kind to be, at least, practically as tall as desired. Preferably, an internal aeroponic nutrient supply for cultivating the moved plants is provided. A plant cultivation system of this kind is particularly suitable for cultivating strawberries, leaf lettuce, spinach, rocket and/or bush tomatoes. An advantageous harvest is possible if the plants or fruits are harvested in the region of the lower deflection point, in particular by means of an automated harvesting machine.

According to a further specific embodiment of the device according to the invention, an illumination unit is provided, which allows the plants to be irradiated with the suitable wavelengths in a selective, controlled manner. In this case too, it is again conceivable to adapt the illumination to the given needs of the plant and/or the different growth phases. In this way, the illumination of the plants is specially adapted to the plant growth. According to a further embodiment, the device is designed such that both illuminated and non-illuminated sections of the conveyor path are provided.

Furthermore, the device for automated plant cultivation according to the invention preferably has a fitting system, by means of which the conveyor belt and/or the carrier material provided on the conveyor belt is fitted with at least one seed and/or a seedling in an automated manner. It is also conceivable to provide, in a region of the conveyor belt, a harvesting module allowing the plant that has grown to a desired extent, in particular the leaves and/or the fruit, to be harvested. Further preferably, the device according to the invention has a section, preferably upstream of the harvesting model, in which the conveyor belt is cleaned and/or sterilized.

Preferably, a device according to the invention is designed such that a fitting unit and a harvesting unit are provided, between which a cleaning and/or sterilization system, in particular a steam stylizing system, is located in the direction of movement of the conveyor belt such that the conveyor belt is cleaned and/or sterilized after the grown plants have been harvested and before refitting.

In relation to the fixing of the plants in or on the conveyor belt, it is in principle conceivable for the seeds and/or seedlings to be directly or indirectly fixed in or on the conveyor belt by means of a carrier material. According to an alternative embodiment, the conveyor belt has suitable plant containers that can be fitted with plants and are fastened to the circulating conveyor belt by means of fastening elements. In this connection, it is conceivable, for instance, for the conveyor belt to comprise at least one conveyor chain into which a hook of the plant container that serves as a fastening element is hooked as soon as a plant is to be transported along the conveyor path. Accordingly, if plant containers that can be connected to the conveyor belt are used, said containers are preferably detached from the conveyor belt or conveyor chain for the harvesting process, cleaned after the harvest is complete, and finally supplied back to the fitting system. At the start of the conveyor belt or conveyor tracks, corresponding plant containers are hooked into said tracks again after being fitted with a seed or seedling.

In addition to a specific device for automated plant cultivation, the invention further relates to a method for automated cultivation of crops or ornamental plants.

An essential feature of the method according to the invention is that the plants are transported in a manner rigidly fixed on the conveyor belt and are continuously realigned by being at least practically vertically transported, at least temporarily, in conjunction with deflections at upper and lower deflection points. As a result of the plants being fixedly guided, it is furthermore relatively simple to ensure continuous aeroponic watering, without the leaves of the plants being unnecessarily moistened. For this reason, diseases of the leaf mass can be largely avoided. The way in which the leaves and the root region are spatially separated also allows an atmosphere that can be better controlled, and excessive humidity can be reliably avoided.

Furthermore, a particular advantage of the invention is that it is possible to adapt the conveyor path or the conveyor belt to the size of the plants. Preferably, this is done by mechanically expanding the conveyor belt in the region of the fixing points and/or expanding the distances between individual cultivation modules to meet the increasing space requirement of the growing plants. An illumination and watering procedure that is optimized to the altered distances between the plants allows considerable savings to be made with regard to set-up and energy consumption. The device according to the invention, in which cultivation modules having a vertical loop-like design are preferably lined up in a modular fashion, allows plants to be cultivated in a manner that is particularly flexible, adapted to the planting and the growth stage of the plants, and also economical. Furthermore, a combination with an automated fitting unit and/or harvesting unit at the start and end, respectively, of the conveyor path advantageously allows considerable cost savings to be made.

BRIEF DESCRIPTION OF THE DRAWINGS

In the following, the invention will be described in more detail, without limiting the general inventive concept, on the basis of embodiments and with reference to the drawings.

DETAILED DESCRIPTION

Figure 1:
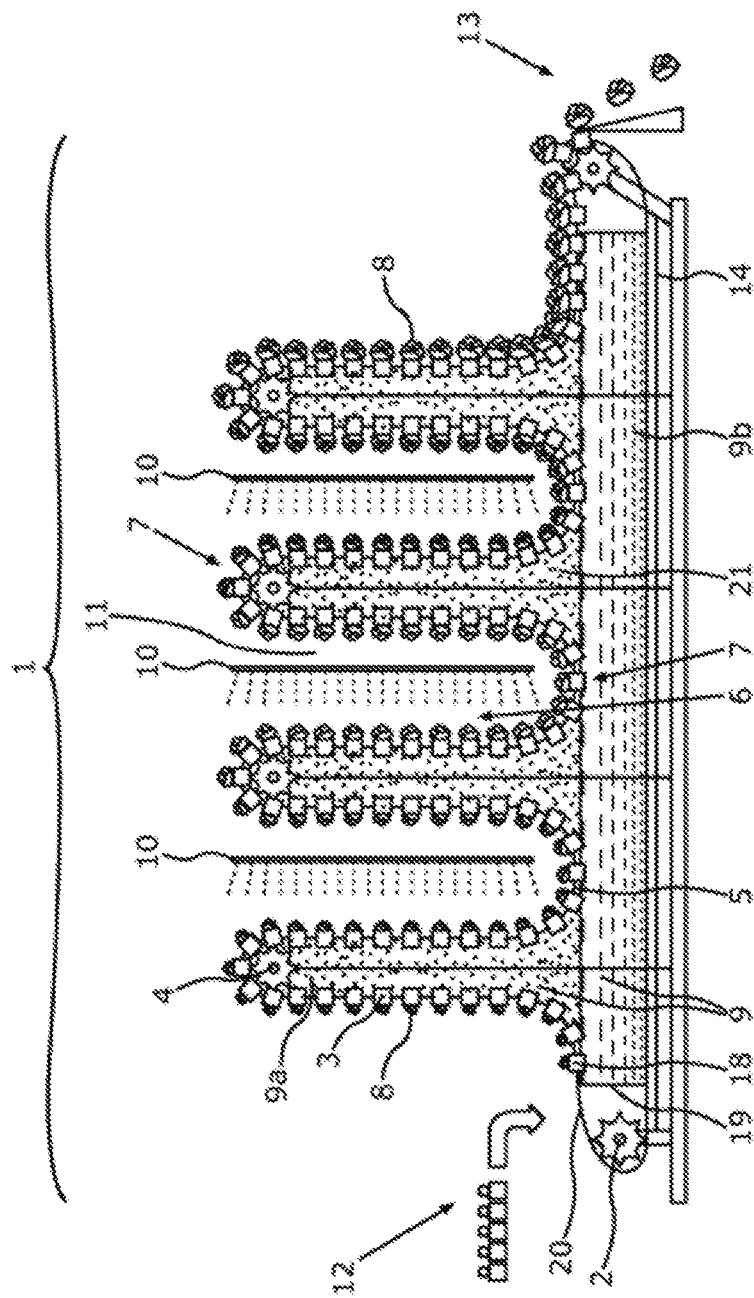
FIG. 1 is a schematic view of a device for automated plant cultivation according to the invention.

FIG. 1 is a schematic view of a device for automated plant cultivation according to the invention. An essential feature of said device is that the plants 8 are fixed on the conveyor belt 2 during transport along the conveyor path 1, the roots of the plants 8 being located, at least for the most part, on the other side of the conveyor belt 2 in relation to the leaves. The dimensions of the conveyor path 1 and the movement speed of the conveyor belt 2 are selected such that the period of time over which the plants 8 are moved along the conveyor path 1, from placing a seed or seedling on the conveyor belt 2 to removal from the conveyor belt 2, corresponds to a growing phase of the corresponding plant 8.

In relation to the arrangement of the conveyor path 1, it is particularly important that the plants 8 fixed on the conveyor belt 2 are moved both upwardly and downwardly vertically in sections, while the plants are moved at least temporarily horizontally between the individual vertical path sections 6, in particular in the region of the upper and lower deflection points 4, 5.

At the start of the conveyor path 1, a fitting unit 12 is provided, by means of which the receiving elements 3 of the conveyor belt 2 are each fitted with a seedling 8. The receiving elements 3 according to the described embodiment each have a carrier material 18, preferably rock wool, in which the plant 8, in particular the roots thereof are fixed. An essential feature is that the roots of the plants 8 are located in a region 19 below the conveyor belt 2, while the leaves extend in a region 20 above the conveyor belt 2. The regions 19, 20 in which the roots and the leaves are respectively located are thus spatially separate from one another. Furthermore, while the plants 8 are moved along the vertical sections 6 of the conveyor path 1, the roots are located in a ventilated space in which the plants 8 undergo an aeroponic moistening and nutrient supply process 9a.

On account of the specific design of the conveyor path 1, the conveyor belt 2 alternately moves the plants 8 vertically as far as an upper deflection point 4 and then down again towards a lower deflection point 5. As soon as the plants 8 reach the lower end of the vertical path 6, the plants are moved horizontally at least over a short path section 7. During the movement in the region of the lower deflection point 5, the carrier material, together with the roots of the plant 8 arranged therein, is immersed in an immersion bath 9b such that the plants 8 are hydroponically moistened and supplied with nutrients. Following the at least momentary horizontal movement, the plants 8 are moved once again over the next two vertical path sections 6 of the conveyor path 1, with the upper deflection point 4 therebetween. While the plants 8 are being moved along said vertical path sections 6, the plant roots once again undergo aeroponic moistening 9a on the lower surface of the conveyor belt 2.

A section of the conveyor path 1 consisting of, firstly, two vertical sections 6 in which the plants 8 are moved from bottom to top and then from top to bottom and, secondly, a deflection point 5 arranged between the vertical sections, is referred to as a module or cultivation module. The configuration of the module and the setting of the speed of the conveyor belt 2 are such that the plants 8 cycle through a module of this kind within 24 hours. An overall system is in turn composed of the number of modules required to achieve a complete growth phase of the given plant 8.

Furthermore, the device for automated plant cultivation has an illumination unit 10 designed such that while being moved along the conveyor path 1, the plants 8 are partly illuminated with artificially generated light and partly not illuminated. In the embodiment shown in FIG. 1, the plants 8 are always illuminated when they are being moved downwards along a vertical path section 6 between the upper deflection point 4 and the lower deflection point 5. However, a shaded phase 11 is provided when the plants 8 are being moved along a path section extending from bottom to top. In this connection, the illumination unit 10 is covered such that the plants 8 are not illuminated. In principle it is conceivable to adapt the type, intensity and duration of the illumination to the given type of plant. In each case, the illumination is controlled or is appropriately adjusted by means of sensors and a control unit. In the embodiment shown in FIG. 1, LED panels that are arranged opposite respective downwardly extending vertical path sections 6 are provided as illumination units 10.

Moreover, the device for automated plant cultivation shown in FIG. 1 has an adjustment unit 21 such that the distance between the individual modules, which each consist of two vertical path sections 6 and an upper deflection point 4 arranged therebetween, can be adapted to the growth in size of the individual plants 8. As can be clearly seen in FIG. 1, the size of the plants 8 increases while they are being transported along the conveyor path 1. To the extent to which the plants 8 grow, the distance between the individual modules is increased and the illumination is adapted to the change in the light requirement on account of the larger amount of greenery of the plants 8. As a complement to said measures, the conveyor belt 2 is also designed such that the distance between the individual receiving elements 3 in which the plants are fixed can be changed on the basis of the plant growth. A specific embodiment of a conveyor belt 2 that can be adapted to the growth in size of the plants will be described in connection with FIG. 2.

At the end of the conveyor path 1, an automated harvesting unit 13 is provided, which removes, from the circulating conveyor belt 2, the plants 8 that have grown to normal size. Directly upstream of the harvesting unit 13, the conveyor belt 2 is deflected once again and then circulates back to the fitting unit 12. To ensure the required cleaning and sterilization of the conveyor belt 2, along the path between the harvesting unit 13 and the fitting unit 12 the conveyor belt 2 is first cleaned and then undergoes surface sterilization by means of a steam sterilization system 14. The conveyor belt 2 thus returns to the fitting unit 12 in a fully cleaned and sterilized state, the fitting unit refitting the individual receiving elements 3 of the conveyor belt 2 with carrier material 18, at least provided that said material cannot be used multiple times, and with seeds or seedlings 8.

As shown in FIG. 1, it is advantageous if the individual receiving elements 3 are first fitted with carrier material 18, provided that the material cannot be re-used, and with a seed or seedling 8 in the fitting unit 12 or in an upstream process step, such that the already fitted receiving elements 3 can be placed on and/or fastened to the conveyor belt 2.

Generally, however, it is also conceivable for the receiving elements 3 to be integrated into the conveyor belt 2 or at least rigidly connected thereto such that the fitting unit 12 merely inserts a seed or a seedling 8 and, if required, fresh carrier material 18 into the receiving elements 3.

In both cases, it is possible for the receiving elements 3 to already have carrier material 18 into which seeds or seedlings 8 are inserted by the fitting unit 12, or for the individual receptacles 3 of the conveyor belt 2 to be fitted with a seed or a seedling 8 of which the roots are already in the carrier material 18.

Figure 2:
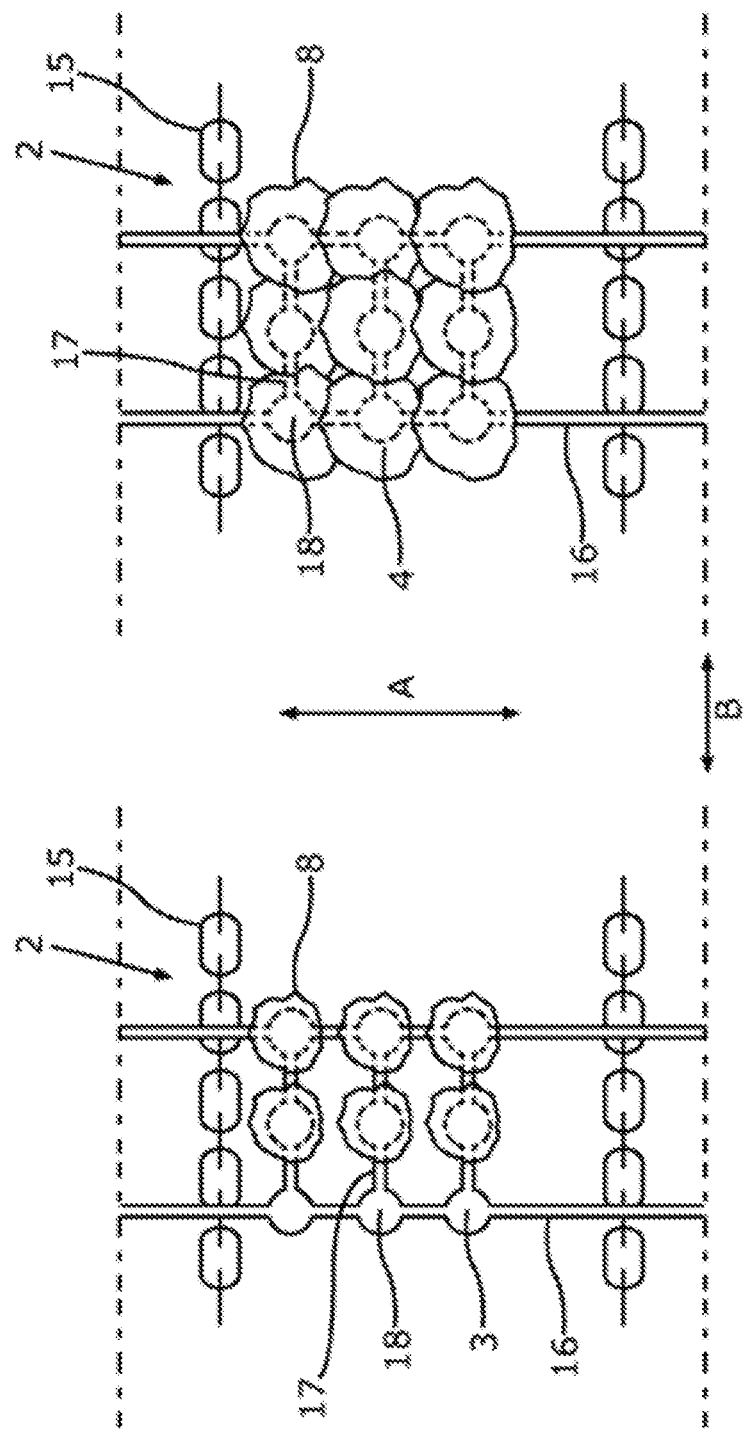
FIG. 2 is a plan view of a conveyor belt suitable for a device for automated plant cultivation.

FIG. 2 is a plan view of a portion of a conveyor belt 2 that can be adapted to the growth of the plants 8 while they are being conveyed along the conveyor path 1. It makes sense to adjust the distance between the individual receiving elements 3, as appropriate; this is because, as the plants 8 grow, in particular the leafy component increases, in the case of heads of lettuce for example, and thus the surface area requirement of the individual plants 8 also grows. For this reason, the individual receiving elements 3 of the conveyor belt 2 are suitably spread apart by means of mechanical elements such that the individual plant 8 has more space to grow and is sufficiently illuminated.

The above-described adaptation is achieved substantially by varying the distance between the receiving elements 3, in each of which a plant 8 or the roots thereof is/are fixed in the carrier material 18, on the basis of the time that the plants 8 have spent on the conveyor belt 2. Taking into consideration the extent and speed of the plant growth, the distances between the individual receptacles are increased while the plants 8 are being transported. In this connection, FIG. 2 shows a portion of a conveyor belt 2, together with plants 8 fixed thereto, in two different growth stages of the plants 8. While the plants 8 shown to the left in in FIG. 2 are still at the start of the conveyor path 1 and are relatively small, the plants are about to be harvested in the state shown to the right in FIG. 2 and have therefore reached a corresponding size. To take this growth in size into account, the distances between individual receiving elements 3 are considerably larger in the right side of FIG. 2 than the corresponding distances in the left side of FIG. 2.

In the embodiment shown in FIG. 2, the conveyor belt 2 has conveyor chains 15, to which the individual plant receptacles 3 are fastened by means of suitable, elastic transport belts 16. The transport belts 16 are designed such that both the distance A between the parallel transport belts 16 and the distance B between the receiving elements 3 fastened to a given transport belt 16 can be changed. While a change to the distance A can be achieved by moving the transport belts 16 outwards, the distances B between the individual receptacles 3 are changed by elastically elongating the transport belts 16 in the longitudinal direction. Similarly, an increase in the distances to the receiving elements 3 not directly connected to the transport belts 16 is achieved by providing, between the receiving elements 3, elastic connection elements 17 that are accordingly elongated when the transports belts 16 are moved.

The receptacles 3 can be fastened to the transport belts 16 by hooking at least part of the receptacles 3 into the transport belts 16. It is also conceivable for at least part of the receptacles 3 to be rigidly connected to one transport belt 16 each.

As can be seen in FIG. 2, however, not all the receptacles 3 have to be directly connected to a transport belt 16 but can also be indirectly connected to at least one transport belt 16 via other receptacles 3 by means of elastic connections 17. As the transport time of the plants 8 increases, the transport belts 16 are moved apart and longitudinally elongated, for example by coiling the transport belts around drums that are moved along the conveyor path by means of the transport mechanism, such that the distances between the receptacles 3, together with the plants 8 therein, increase. In this connection, it is also conceivable for elastically elongatable elements 17 to be provided merely between the individual receiving elements 3 and for merely the outer receptacles 3, i.e. the receptacles 3 located at the corner points in FIG. 2, to be pulled outwards. Similarly, the receptacles 3 could be arranged at different positions in an elastic net, or a corresponding elastic net could form at least part of the conveyor belt 2, it being possible to pull the net apart, as required, in particular on the basis of the plant growth, in order to change the distances between the receptacles 3, as required.

Furthermore, it is conceivable for the individual receptacles 3 not to be moved as a result of the movement of elastic connection elements 17, but for the individual receptacles 3 to be individually actively movable. Irrespective of the type of selected mechanism, it is essential that the distances between the individual receiving elements is changed both in the conveying direction and perpendicular thereto in order to meet the increasing space requirement of the plants.

Figure 3:
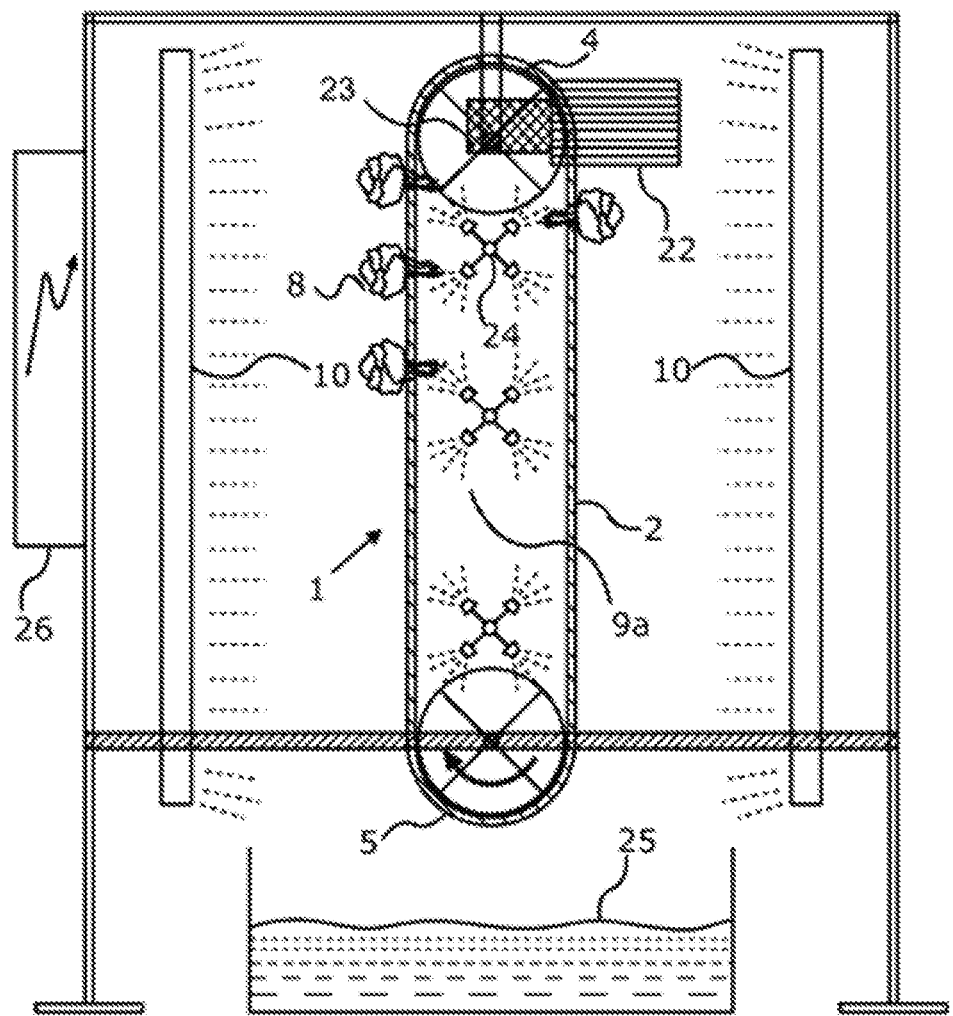
FIG. 3 is a schematic view of a demonstrator of a plant cultivation system according to the invention, used for a plant cultivation experiment.

To check the technical feasibility and to prove the advantages of the solution according to the invention, a demonstrator shown schematically in FIG. 3 was constructed. Said demonstrator has a conveyor path 1 having a conveyor belt 2 that circulates in an oval shape and comprises two vertical path sections 6 and two horizontal path sections 7, one in the region of the upper deflection point 4 and another in the region of the lower deflection point 5. The horizontal path sections 7 of the conveyor path 1 are relatively short on account of the design of the demonstrator and are limited to the particular inversion region of the conveyor belt 2.

The conveyor belt 2 has slats made of a plastics material, preferably polyvinyl chloride (PVC), which are in the form of roller shutter elements and on which the plants 8 are arranged such that the roots protrude into a region 19 below the conveyor belt 2, while the leaves and/or fruits protrude into a region 20 above the conveyor belt 2. A nutrient supply unit 9 comprising means for aeroponic nutrient supply 9a is located below the conveyor belt or within the conveyor belt 2 circulating in an oval-like manner. In the embodiment shown, the aeroponic nutrient supply unit has three spraying nozzles 24 in the form of non-drip four-jet heads connected to a recirculating water pump system having a nutrient solution tank 25.

The conveyor belt 2 is driven by means of an electric motor 22 that is connected to the conveyor belt 2 by means of a worm drive 23.

To illuminate the plants, illumination strips having LEDs are provided as illumination units 10 in the region 20 above the conveyor belt and in parallel with the vertical path sections 6. The drive motor 22 and the illumination strips serving as illumination units 10 are connected to a central control unit 26, which adapts both the illumination and the speed at which the plants are moved along the conveyor path 1 to the requirements of the given plants being moved. For example, illumination and dark or shaded phases can be varied in this way. The demonstrator shown in FIG. 3 was installed in a climatic chamber having variable climate control and was used for growth experiments on various lettuce varieties.

Starting with the demonstrator shown in FIG. 3, it is conceivable to use the demonstrator or an at least similarly designed device as a basic module for a plant cultivation system comprising a plurality of basic modules of this kind. It is essential here that it is again possible to provide, depending on the given requirements of a plant, a plant cultivation system which ensures that vertical and horizontal paths 6, 7 are arranged according to requirements and thus in an optimized manner.

Using the demonstrator shown in FIG. 3, a specific plant cultivation experiment was carried out. A professional pelletized lettuce variety (Expertise RZ) from the company Rijkzwaan was used as a seed material. In a first step, said variety was produced in a nutrient solution in a 2 cm rock wool block and under 120 µmol/s/m² of LED light (blue/dark red) for 11 days. In the period, the temperature was set to 27° C. with 65% humidity for 18 hours during the day and to 19° C. with 55% humidity for 6 hours at night. Accordingly, the illumination was switched on for 18 hours and switched off for 8 hours.

The seedlings were transferred to the demonstrator on day 12, said seedlings simultaneously being transferred in a 10 cm rock wool block for the hydroponic NFT cultivation (NFT: nutrient film technique). The illumination of around 135 µmol/s/m² was achieved by blue and dark-red LED light strips (GreenPower production module from the company Philips). A misting system (from the company Netafim) designed for 5 bar and with interval sprinkling was used for the aeroponic nutrient supply, with nutrient solution being sprinkled for a period of 5 seconds, and the sprinkling then being disabled for 4 minutes.

The pH value of the nutrient solution was set to between 5.5 and 6.5 by means of diluted 5% nitric acid, and the nutrient content was kept to 0.8-1.0 EC (electrical conductivity) by means of liquid fertilizer (from the company YARA).

For the entire cultivation phase, the plants underwent 360 degrees of rotation over the course of 24 hours by the conveyor belt being gradually moved. After 3 weeks of cultivation, the leaf biomass was weighed.

The results of the above-described plant cultivation experiment are set out below. After three weeks of cultivation in the demonstrator system, as shown in FIG. 3, a significant (t-test: 0.03) increase in leaf biomass of up to 25% was observed in comparison with standard hydroponic NFT cultivation with LED illumination. Furthermore, on account of the continuous realignment, round and uniform heads of lettuce were formed. By contrast, the plants that were cultivated statically and horizontally on a vertical wall were strongly influenced by the gravitational field of the earth, and the heads were misshapen. It was thus shown that the embodiment according to the invention induces good plant growth.

One embodiment of the device according to the invention relates to a device for promoting the growth of plants 8, including a conveyor belt 2 which can be moved along a conveyor path 1 and is intended for transporting, at least in sections, plants 8 which are at least temporarily supplied with nutrients by a nutrient supply 9 and irradiated by an illumination unit 10 during movement along the conveyor path 1, the conveyor path 1 being at least approximately horizontal in at least one first section 7, and being at least approximately vertical in at least one second section 6, wherein the plants 8 are at least temporarily fixed relative to the conveyor belt 2 during transport along the conveyor path 1 such that at least parts of roots of the plants 8 protrude into a region 19 located below a lower surface of the conveyor belt 2, while at least parts of leaves and/or fruits of the plants 8 protrude into a region 20 located above an upper surface of the conveyor belt which opposes the lower surface, and the nutrient supply 9 includes, in the region 19 located below the lower surface of the conveyor belt, a supply unit 9 for aeroponically supplying the plants 8 with nutrients, the supply unit 9 misting a nutrient medium and/or discharging said nutrient medium towards the lower surface of the conveyor belt.

A first development of the aforementioned embodiment of a device according to the invention is characterized in that the conveyor belt 2 includes, at least in regions, a carrier material 18 in which the plants 8 are fixed at least temporarily during transport along the conveyor path 1.

A second development of the aforementioned embodiment of a device according to the invention, having or not having the development just described, is characterized in that the conveyor path 1 has a lower deflection point 5 between two at least approximately vertical sections 6.

A third development of the aforementioned embodiment of a device according to the invention, having or not having the developments just described, is characterized in that the conveyor path 1 has an upper deflection point 4 between two at least approximately vertical sections 6.

A fourth development of the aforementioned embodiment of a device according to the invention, having or not having the developments just described, is characterized in that an at least partly automated fitting unit 12 is provided, which fits the conveyor belt 2 with plant seeds and/or seedlings 8.

A fifth development of the aforementioned embodiment of a device according to the invention, having or not having the developments just described, is characterized in that at least one section 11 that is illuminated by the illumination unit 10 and one section that is not illuminated are arranged along the conveyor path 1.

A sixth development of the aforementioned embodiment of a device according to the invention, having or not having the developments just described, is characterized in that the conveyor path 1 has two at least approximately vertically extending sections 6 and two horizontal sections 7 that each connect the vertical sections 6, at least one supply unit for aeroponically supplying the plants 8 with nutrient medium being arranged between the opposite lower surfaces of the conveyor belt 2 moved along the conveyor path 1.

A seventh development of the aforementioned embodiment of a device according to the invention, having or not having the developments just described, is characterized in that the conveyor belt 2 has a plurality of movably interconnected slats.

An eighth development of the aforementioned embodiment of a device according to the invention, having or not having the developments just described, is characterized in that the nutrient supply 9 has at least one immersion bath 9b containing nutrient solution, at least roots of the plants 8 being guided through said immersion path at least in sections along the conveyor path 1.

A ninth development of the aforementioned embodiment of a device according to the invention, having or not having the developments just described, is characterized in that at least adjustment unit 21 is provided to change the distance between a section of the conveyor path 1 extending at least approximately vertically from top to bottom and a section of the conveyor path 1 extending at least approximately vertically from bottom to top.

A tenth development of the aforementioned embodiment of a device according to the invention, having or not having the developments just described, is characterized in that a module is formed by a section of the conveyor path 1 extending at least approximately vertically from bottom to top and a section of the conveyor path 1 extending at least approximately vertically from top to bottom, and a number of modules required to achieve a growing phase of the plant are interconnected by interface elements, depending on the plant to be grown, in particular the space necessary for growth of the plant.

According to an eleventh development of the aforementioned embodiment of a device according to the invention, the tenth development is developed in that at least one illumination unit (10) is integrated into the module.

According to a twelfth development of the aforementioned embodiment of a device according to the invention, the tenth or eleventh development is developed in that two modules are connected by an at least approximately horizontally extending section of the conveyor path 1, the length of said section being selected on the basis of the plant to be grown.

According to a thirteenth development of the aforementioned embodiment of a device according to the invention, the tenth, eleventh or twelfth development is developed in that the device is produced by assembling at least two pre-grouped modules.

A fourteenth development of the aforementioned embodiment of a device according to the invention, having or not having the developments just described, is characterized in that an at least partly automated harvesting unit 13 is provided, which removes plants 8 from the conveyor belt 2 at least in part.

A fifteenth development of the aforementioned embodiment of a device according to the invention, having or not having the developments just described, is characterized in that a cleaning and/or sterilization unit 14 for cleaning and/or sterilizing the conveyor belt 2 is arranged in a region of the conveyor path 1 located between a region in which the plants are removed from the conveyor belt 2 at least in part and a region in which plant seeds and/or seedlings 8 are fixed on the conveyor belt 2.

A further special embodiment of a device according to the invention relates to a device for promoting the growth of plants 8, including a conveyor belt 2 which can be moved along a conveyor path 1 and is intended for transporting, at least in sections, plants 8 which are at least temporarily supplied with nutrients by a nutrient supply 9 and irradiated by an illumination unit 10 during movement along the conveyor path 1, the conveyor path 1 being at least approximately horizontal in at least one first section 7, and being at least approximately vertical in at least one second section 6, wherein the plants 8 are at least temporarily fixed relative to the conveyor belt 2 during transport along the conveyor path 1 such that at least parts of roots of the plants 8 protrude into a region 19 located below a lower surface of the conveyor belt 2, while at least parts of leaves and/or fruits of the plants 8 protrude into a region 20 located above an upper surface of the conveyor belt which opposes the lower surface, a module being formed by a section of the conveyor path 1 extending at least approximately vertically from bottom to top and a section of the conveyor path 1 extending at least approximately vertically from top to bottom, and a number of modules required to achieve a growing phase of the plant being interconnected by interface elements, depending on the plant to be grown, in particular the space necessary for growth of the plant, and at least two modules being connected by an at least approximately horizontally extending section of the conveyor path 1.

A further special embodiment of the invention relates to a method for promoting the growth of plants 8, in which the plants 8 are moved along a conveyor path 1 by a conveyor belt 2 and are at least temporarily supplied with nutrients by a nutrient supply 9 and irradiated by an illumination unit 10 during movement along the conveyor path 1, the plants 8 being moved at least approximately horizontally in at least one first section 7 of the conveyor path 1 and at least approximately vertically in at least one second section 6 of the conveyor path 1, characterized in that the plants 8 are at least temporarily fixed relative to the conveyor belt 2 during transport along the conveyor path 1 such that at least parts of roots of the plants 8 protrude into a region 19 located below a lower surface of the conveyor belt 2, while at least parts of leaves and/or fruits of the plants protrude into a region 20 located above an upper surface of the conveyor belt 2 which opposes the lower surface.

In a first method-based development of the above-described special embodiment of a method according to the invention, while being moved at least approximately vertically the plants 8 are at least temporarily aeroponically supplied with water and/or nutrients.

In a second method-based development of the above-described special embodiment of a method according to the invention, having or not having the first method-based development, while being moved at least approximately horizontally the plants 8 are at least temporarily hydroponically supplied with water and/or nutrients.

In a third method-based development of the above-described special embodiment of a method according to the invention, having or not having the first or second method-based development, the entire conveyor path 1 is at least temporarily illuminated.

LIST OF REFERENCE NUMERALS 1 conveyor path
2 conveyor belt
3 receptacle
4 upper deflection point
5 lower deflection point
6 vertical path section
7 horizontal path section
8 plant
9 nutrient supply unit
9a aeroponic nutrient supply unit
9b hydroponic nutrient supply unit
10 illumination unit
11 shaded phase
12 fitting unit
13 harvesting unit
14 cleaning and sterilizing unit
15 conveyor chain
16 transport belt
17 elastic connection elements
18 carrier material
19 region below the conveyor belt
20 region above the conveyor belt
21 adjustment unit
22 electric motor
23 worm drive
24 spraying nozzle
25 nutrient medium tank
26 central control unit

What is claimed is:

1. A device for promoting the growth of plants, the device comprising
a conveyor belt that moves along a conveyor path and configured for attaching plants at receiving elements so that as plants grow, plant stems and leaves protrude outward from an outer side of the conveyor belt and plant roots or tubers protrude inward through an underside of the conveyor belt to define a longitudinal axis that is not parallel with the conveyor belt, wherein the conveyor path is a closed circular path or a closed oval path having an upper deflection point vertically above a lower deflection point so that as plants continually alternate between upward and downward movement along the closed circular or oval path, the attached plants alternatingly realign within the gravitational field so that gravitational forces act against different lateral sides of the plants;

a nutrient supply directed at the conveyor belt to supply nutrients to the plant roots or tubers during transport; and wherein the device is configured to expose plants during transport to natural light, or the device further comprises an illumination unit directed towards the outer side of the conveyor belt to irradiate the leaves during transport with artificially generated light.

2. The device according to claim 1, wherein the receiving elements comprise a carrier material for plant attachment.

3. The device according to claim 1, wherein an at least partly automated fitting unit is provided, which fits the conveyor belt with plant seeds and/or seedlings.

4. The device according to claim 1, wherein at least one section is illuminated by the illumination unit and one section that is not illuminated are arranged along the conveyor path.

5. The device according to claim 1, further comprising an at least partly automated harvesting unit, which removes plants from the conveyor belt at least in part.

6. The device according to claim 1, further comprising a cleaning and/or sterilization unit for cleaning and/or sterilizing the conveyor belt.

7. The device according to claim 1, wherein the nutrient supply is an aeroponic nutrient supply arranged inside the conveyor path and configured to deliver nutrients directly towards the underside of the conveyor belt, thereby permitting direct feeding of the plant roots or tubers during transport.

8. The device according to claim 1, wherein the device is adjustable in height.

9. The device of claim 1, wherein the conveyor belt comprises:
two elastic transport belts aligned in parallel, each transport belt joining a plurality of receiving elements; and
elastic connection elements that connect receiving elements across different transport belts.

10. The device of claim 9, wherein the elastic connection elements elongate to increase spacing between the two elastic transport belts as the conveyor belt moves through the conveyor path.

11. The device of claim 1, wherein the nutrient supply is positioned underneath the underside of conveyor belt to deliver nutrients to the roots.

12. The device of claim 1, wherein the nutrient supply is an aeroponic nutrient supply arranged inside the closed circular or the closed oval path.

13. The device of claim 1, wherein the nutrient supply comprises a misting system selectable between interval and constant spraying.

14. A method of promoting the growth of plants, comprising attaching plants to the device of claim 1, and moving the plants along the conveyor path.

15. A method for promoting the growth of plants, comprising:
providing the device of claim 1;
fixing plants to the conveyor belt such that at least parts of roots or tubers of the plants protrude inward through the underside of the conveyor belt, while at least parts of leaves and/or fruits of the plants protrude outward from the outer surface of the conveyor belt which opposes the underside; and
moving the conveyor belt along the conveyor path.

16. The method according to claim 15, wherein the entire conveyor path is at least temporarily illuminated.

* * * * *